United States Patent [19]
Naffziger

[11] Patent Number: 6,014,732
[45] Date of Patent: Jan. 11, 2000

[54] CACHE MEMORY WITH REDUCED ACCESS TIME

[75] Inventor: Samuel D. Naffziger, Fort Collins, Colo.

[73] Assignee: Hewlett-Packard Company, Palo Alto, Calif.

[21] Appl. No.: 08/955,821

[22] Filed: Oct. 22, 1997

[51] Int. Cl.[7] .................................................. G06F 12/10
[52] U.S. Cl. .......................................... 711/203; 711/118
[58] Field of Search .................................... 711/118, 202, 711/203, 206

[56] References Cited

U.S. PATENT DOCUMENTS 4,969,122  11/1990  Jensen ........................................ 365/49
5,133,058  7/1992   Jensen ........................................ 711/207

OTHER PUBLICATIONS

Lee et al., "Shared Tag for MMU and Cache Memory", IEEE, pp. 77–80, Oct. 11, 1997.

*Primary Examiner*—Eddie P. Chan
*Assistant Examiner*—Kevin L. Ellis
*Attorney, Agent, or Firm*—Augustus W. Winfield

[57] ABSTRACT

A cache with a translation lookaside buffer (TLB) that eliminates the need for retrieval of a physical address tag from the TLB when accessing the cache. The TLB includes two content addressable memories (CAM's). For each new cache line, in the tag portion of the cache, instead of storing physical tags, the cache stores vectors called physical hit vectors. Physical hit vectors are generated by a first TLB CAM. Each physical hit vector indicates all locations in the first TLB CAM containing the physical tag of the cache line. For a cache access, a second TLB CAM receives a virtual tag and generates a vector called a virtual hit vector. The virtual hit vector indicates the location in the second TLB CAM of the corresponding virtual tag. Then, instead of retrieving and comparing physical tags, the cache compares a virtual hit vector to a set of physical hit vectors without having to retrieve a physical tag. As a result, one operation is eliminated from a time critical path, reducing the access time. For caches having variable page sizes, an additional CAM structure stores page offset bits and corresponding bit masks from the operating system. Page offset bits are then used to further qualify comparison of virtual hit vectors and physical hit vectors.

8 Claims, 2 Drawing Sheets

CACHE MEMORY WITH REDUCED ACCESS TIME

FIELD OF INVENTION

This invention relates generally to computer memory systems and more specifically to improving access time in cache memory.

BACKGROUND OF THE INVENTION

Most computer systems employ a multilevel hierarchy of memory systems, with relatively fast, expensive, limited-capacity memory at the highest level of the hierarchy and proceeding to relatively slower, lower cost, higher-capacity memory at the lowest level of the hierarchy. Typically, the hierarchy includes a small fast memory called a cache, either physically integrated within a processor integrated circuit or mounted physically close to the processor for speed. There may be separate instruction caches and data caches. There may be multiple levels of caches.

If a processor requests an item from a cache and the item is present in the cache, the event is called a cache hit. If a processor requests an item from a cache and the item is not present in the cache, the event is called a cache miss. In the event of a cache miss, the requested item is retrieved from a lower level of the memory hierarchy. In many processor designs, the time required to access an item for a cache hit is one of the primary limiters for the clock rate of the processor. Therefore, optimization of access time for cache hits is critical for performance. There is an ongoing need for improvement in cache access time for computer processors.

Typically, a memory is organized into words (for example, 32 bits or 64 bits per word). Typically, the minimum amount of memory that can be transferred between a cache and a next lower level of the memory hierarchy is called a line, or sometimes a block. A line is typically multiple words (for example, 16 words per line). Memory may also be divided into pages (also called segments), with many lines per page. In some systems, page size may be variable.

In many modern computer memory architectures, a CPU produces virtual addresses that are translated by a combination of hardware and software to physical addresses, which access physical main memory. A group of virtual addresses may be dynamically assigned to each page. Virtal memory (paging or segmentation) requires a data structure, sometimes called a page table, that translates the virtual address to the physical address. To reduce address translation time, computers commonly use a specialized associative cache dedicated to address translation, commonly called a Translation Look-aside Buffer (TLB).

If a cache stores an entire line address along with the data and any line can be placed anywhere in the cache, the cache is said to be fully associative. However, for a large cache in which any line can be placed anywhere, the hardware required to rapidly determine if an entry is in the cache (and where) may be very large and expensive. For large caches, a faster, space saving alternative is to use a subset of an address (called an index) to designate a line position within the cache, and then store the remaining set of more significant bits of each physical address (called a tag) along with the data. In a cache with indexing, an item with a particular address can be placed only within a set of lines designated by the index. If the cache is arranged so that the index for a given address maps to exactly one line in the subset, the cache is said to be direct mapped. If the index maps to more than one line in the subset, the cache is said to be set-associative. All or part of an address is hashed to provide a set index which partitions the address space into sets.

With direct mapping, when a line is requested, only one line in the cache has matching index bits. Therefore, the data can be retrieved immediately and driven onto a data bus before the system determines whether the rest of the address matches. The data may or may not be valid, but in the usual case where it is valid, the data bits are available on a bus before the system determines validity. With set-associative caches, it is not known which line corresponds to an address until the full address is compared. That is, in set-associative caches, the result of tag comparison is used to select which line of data bits within a set of lines is presented to the processor.

In a cache with a TLB, the critical timing path for a hit requires a sequence of four operations as follows: (1) a virtual tag must be presented to a Content Addressable Memory (CAM) in the TLB to determine the location of a corresponding physical tag in RAM in the TLB; (2) the physical tag must then be retrieved from the TLB RAM; (3) the physical tag from TLB RAM must then be compared to physical tags accessed from the tag section of the cache; (4) the appropriate data line must be selected. This sequence of four operations is preferably completed in a single phase of a clock cycle, and may in fact limit how short the phase can be. Each of the four operations takes time and a great deal of design effort is dedicated to making each operation as fast as possible. There is a need for improvement in the overall time for the critical time path for accesses to caches with TLB's.

SUMMARY OF THE INVENTION

A cache with a TLB is disclosed in which physical tags do not need to be retrieved from the TLB. Instead of storing physical tags in the cache, the cache stores the location within the TLB where the physical tag is stored. The TLB includes two CAM's. For a cache hit, one of the CAM's in the TLB generates a vector which specifies the location within the TLB where the physical address is stored. This vector is compared to location vectors stored in the cache. This comparison of location vectors provides sufficient information to enable selection of one data line within a set without having to actually retrieve the physical address. As a result, a substantial time consuming operation (physical address retrieval) is removed from the critical time path of a cache hit. In addition, comparing location vectors rather than physical tags enables use of comparison logic which is faster and simpler than the digital comparators conventionally used.

If a system has variable page size, an additional structure is needed. Effectively, the additional structure is another CAM. The additional structure contains page offset bits (part of the address) and page mask bits (provided by the operating system) that designate which page offset bits are relevant. The index bits of the virtual address designate an entry in the additional structure.

A four-way set-associative cache is used for the example embodiment. However, the invention is applicable to any cache having a TLB.

DETAILED DESCRIPTON OF THE PREFERRED EMBODIMENT OF THE INVENTION

Figure 1:
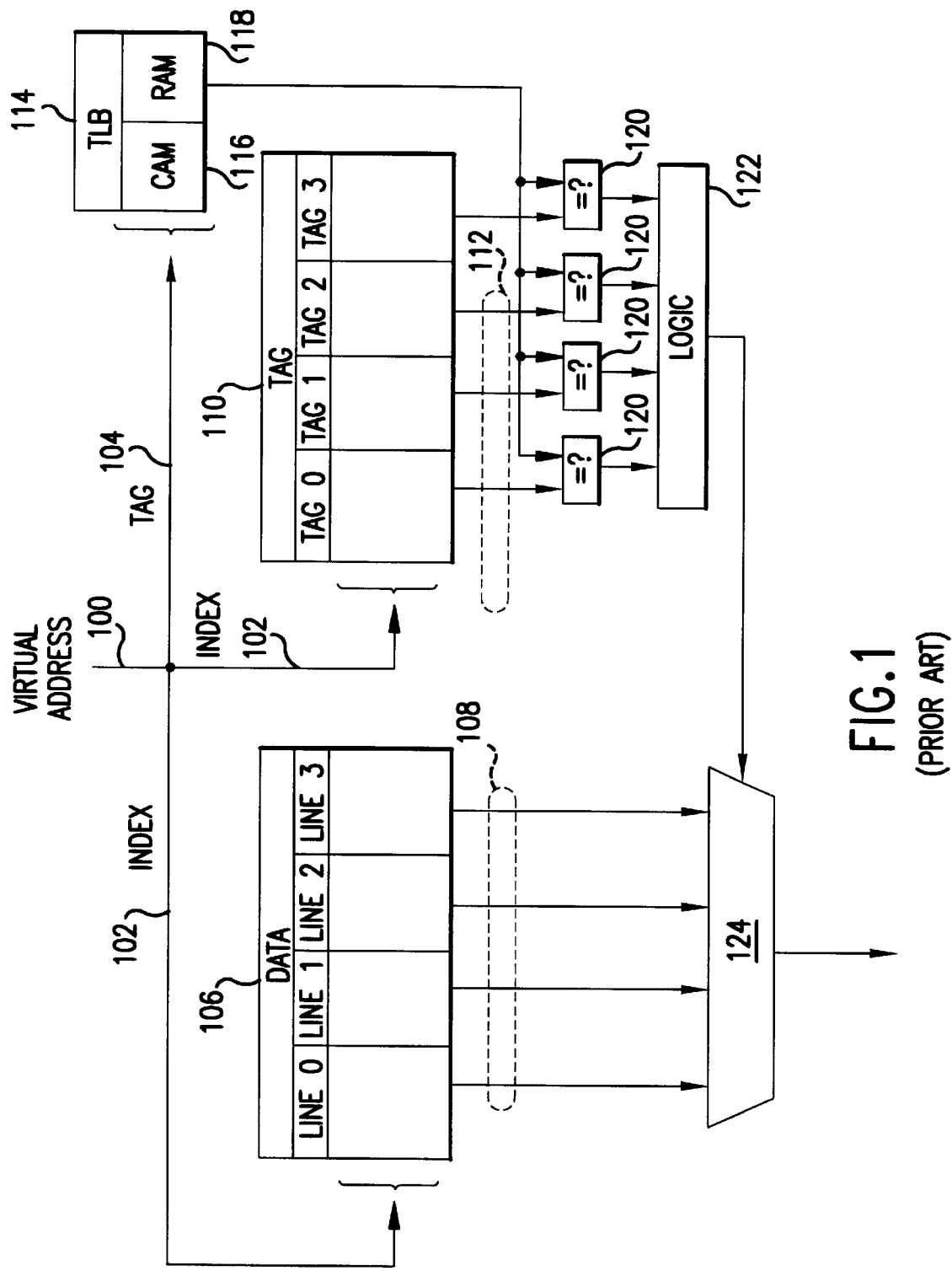
FIG. 1 (prior art) is a block diagram schematic of an example set-associative cache.

FIG. 1 illustrates an example of a prior art cache. Four-way set-associative caches are used for illustration, but the invention is applicable to any cache employing a TLB. A virtual address 100 comprises lower order index bits 102 and upper order tag bits 104. The index bits are typically the same for the virual address and the physical address. The index bits are used to select one set of lines of data in a data section 106 of the cache. The output of data section 106 is four lines of data 108. The index bits are also used to select a set of physical tags in a tag section 110 of the cache. The output of the tag section 110 is four physical tags 112, each corresponding to one data line 108. The virtual tag bits 104 are used to select one entry in a CAM 116 within a TLB 114. The TLB 114 stores both virtual and physical tags. Note that the virtual tag 104 may not find a match in the CAM 116, in which case there is a TLB miss. Note also that multiple virtual tags may map to one physical tag. For a TLB hit, the selected CAM entry designates an address in TLB RAM 118 for a physical tag corresponding to the virtual tag 104. A physical tag is then retrieved from the TLB RAM 118. Each of four digital comparators 120 then compares the physical tag from the TLB RAM 118 to a physical tag 112 from the tag section 110. A matching pair of physical tags indicates through logic 122 which one of four lines of data is selected by a multiplexer 124. Note that for the particular index bits there may not be a matching pair of physical tags, in which case there is a cache miss.

Figure 2:
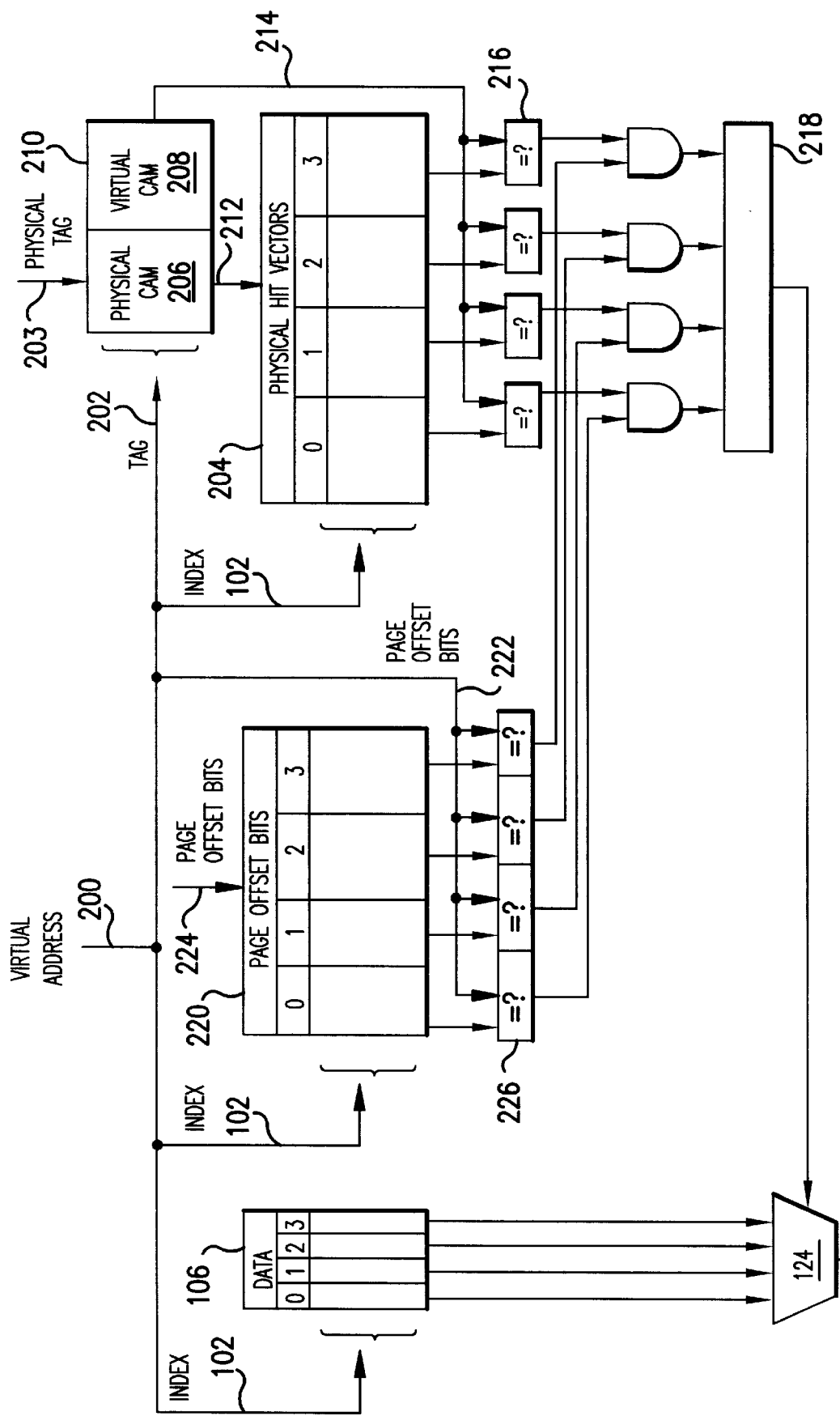
FIG. 2 is a block diagram schematic of an example set-associative cache in accordance with the invention.

FIG. 2 illustrates a 4-way set-associative cache illustrating an example embodiment of the invention. In FIG. 2, the index bits 102, the data section 106 of the cache, and the multiplexer 124 are the same as in FIG. 1. In the cache of FIG. 2, section 204 physically corresponds to section 110 of the cache of FIG. 1, but when a new line of data is placed into the cache of FIG. 2, instead of the physical tag being stored in section 204, a vector 212 (called a physical hit vector and described in more detail below) is stored in section 204.

In the cache of FIG. 2, TLB 210 has two CAM's, a physical CAM 206 containing physical tags and a virtual CAM 208 containing virtual tags. When a new virtual tag 202 is stored in the virtual CAM 208, the corresponding physical tag 203 is also available via the operating system, and the corresponding physical tag 203 is stored in the physical CAM 206. The physical hit vector 212 has a binary "one" corresponding to each location in the physical CAM 206 that has the physical tag 203. For example, the physical hit vector

00000000000010001000000000000000 indicates that the physical tag 203, for this cache line, corresponding to the virtual tag 202, resides in the 14th entry and the 18th entry (for illustration arbitrarily numbered from the left starting with number one) of a 32-entry physical CAM 206. For example, the new virtual tag 202 and corresponding physical tag 203 may have been placed in the 18th entry of CAMs 208 and 206 respectively, and there may have already been a different virtual tag and the same corresponding physical tag in the 14th entry of CAMs 208 and 206 respectively. Upon entry of a new line into the cache, a binary physical hit vector 212, indicating the location of all the instances in the physical CAM 206 of the physical tag 203 of the new line, is generated by the physical CAM 206 and stored into cache section 204, at a row location determined by the index bits and at a column location determined by a set placement algorithm.

For a cache access for the cache of FIG. 2, virtal tag 202 is used by the virtual CAM 208 to generate a vector 214, called a virtual hit vector. If there is a TLB miss, the virtual hit vector 214 is all binary "zeros". If there is a TLB hit, the virtual hit vector 214 has a single binary "one" indicating the one location of the virtual tag 202 in the virtual CAM 208. (each virtual tag in the TLB must be unique, just as in the prior art TLB's).

For a cache access, the index bits 102 select a set of 4 physical hit vectors in cache section 204. Each of the 4 physical hit vectors in cache section 204 is compared (four comparators 216) to the one virtual hit vector 214 from the virtual CAM 208. In the cache of FIG. 1, for any given set of index bits 102, only one of the four selected physical tags in section 110 matches the physical tag from the TLB. Likewise, for the cache of FIG. 2, for a fixed page size (an example modification for variable page size is provided below), for any given set of index bits 102, only one of the four selected physical hit vectors in section 204 will have a binary "one" (all locations of the physical tag in the physical CAM 206) corresponding to the binary "one" in the virtual hit vector 214 (the one location of the virtual tag in the virtual CAM 208). For a fixed page size, a single pair of matching "ones" in the hit vectors then determines which data line is selected by multiplexer 124. Note that for a given set of index bits 102 there may not be any matching "ones" in the compared vectors, in which case there is a cache miss.

The virtual hit vector 214 comprises information that must typically be generated internally by a TLB CAM in order to retrieve the physical tag from TLB RAM (for example, CAM 116 in FIG. 1). However, in the cache of FIG. 2, this information is used external to the TLB 210 and the physical tag from TLB 210 is not retrieved for a cache access. Eliminating the operation of retrieving the physical tag from TLB 210 eliminates an operation that takes a substantial amount of time in the critical time path for the cache.

Digital comparators 120 in FIG. 1 comprise an EXCLUSIVE OR gate for each bit position followed by a large fan-in NOR gate (or logical equivalent). That is, in order to compare two physical tags, each bit position must be examined for two matching logical "ones" or two matching logical "zeros". In contrast, for physical hit vectors in FIG. 2, only a pair of matching logical "ones" is needed to determine a match. Therefore, comparators 216 may be simple AND gates followed by a large fan-in OR gate. AND gates are faster and smaller (simpler) than EXCLUSIVE OR gates and OR gates are much faster than NOR gates.

One potential complication is that for some processor architectures some of the address bits may indicate page size, which may be variable. Typically, this is context or job dependent. For example, one page size may be used for a data base application and another page size for a graphics intensive application. As mentioned above, index bits are typically the same for the virtual address and the physical address. If page size changes, the number of physical index bits changes. Stated alternatively, there may be a set of bits in the address that sometimes are virtual and sometimes are physical. In the present patent document, we will call these bits page offset bits. For each page offset bit, the operating system provides a mask bit that indicates whether the corresponding page offset bit is physical or virtual. Then, the offset bits are included with the virtual tag sent to the TLB, and the mask bits indicate for each offset bit whether the offset bit should be excluded in the compare by the CAM in the TLB. For variable page size, when a physical tag is stored in the physical CAM 206, the length of the stored tag effectively varies depending on how many of the page offset bit are included as a result of masking. However, the physical hit vector 212 represents the results of a comparison to only the physical tag 203 (excluding the page offset bits).

For systems with variable page size, the cache in FIG. 2 includes a separate CAM structure 220. Each entry in structure 220 comprises the page offset bits for the address of a line and the corresponding mask bits. When a line is accessed in the cache, the virtual index bits select a row in the CAM structure 220. The CAM structure 220 compares the stored page offset bits (from offset bits 224) to the received page offset bits 222 (in the virtual address 200). For the CAM structure 220, the stored mask bits indicate for each offset bit location whether the offset bits should be included in the comparison. Likewise, physical CAM 206 includes the offset bits and mask bits with the physical tag, and for TLB 210, the stored mask bits indicate for each offset bit location whether the offset bits should be excluded from the comparison. Note that for each mask bit, a corresponding page offset bit will be included in the CAM 220 compare and excluded in the physical CAM 206 compare or vice versa. Since the physical hit vector 212 represents the results of a comparison to only the physical tag 203 (excluding the page offset bits) then for a large page size with variable page size, there may be multiple successful matches by comparators 216. CAM 220 compares the offset bits that were ignored in the generation of the physical hit vector 212. The outputs of CAM 220 are sets of lines of valid (included as imposed by the corresponding mask bits) offset bits. Comparators 226 then compare the outputs of CAM 220 to the page offset bits 222 of address 200. The outputs of the comparators 226 are then used to further qualify outputs of comparators 216. Then, logic 218 has two outputs indicating which one of four lines of data from section 106 is selected by multiplexer 124.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of accessing data in a cache, the method comprising the following steps:
   receiving, by the cache, a virtual address, the virtual address including a virtual tag and a virtual index;
   generating a first vector, by a translation lookaside buffer, indicating whether a location in the translation lookaside buffer contains a match to the virtual tag;
   retrieving, by a first memory structure, from at least one location determined by the virtual index, at least one second vector, each second vector indicating whether at least one location in the translation lookaside buffer contains a particular physical tag, wherein each second vector is capable of indicating a presence of more than one physical tag when more than one virtual tag in the translation lookaside buffer corresponds to one physical tag in the translation lookaside buffer; and
   comparing, by a digital comparator, the first vector and the second vector; and using the result of comparing to select data from a second memory structure.

2. The method of claim 1, the virtual address further comprising page offset bits, the method further comprising:
   comparing, by a third memory structure, the page offset bits of the virtual address to page offset bits stored in the third memory structure at a location determined by the virtual index; and
   using the result of comparing by the third memory structure to qualify the result of comparing by the digital comparator.

3. A cache, the cache receiving a virtual address comprising index bits and tag bits, the cache comprising:
   a translation-lookaside buffer, the translation lookaside buffer receiving the tag bits and generating a first vector indicating whether a location in the translation lookaside buffer contains a particular virtual tag corresponding to the tag bits;
   a memory structure, receiving the index bits, the memory structure containing second vectors, each second vector indicating at least one location of a physical tag in the translation lookaside buffer, at least one second vector designated by the index bits, wherein each second vector is capable of indicating more than one physical tag when more than one virtual tag in the translation lookaside buffer corresponds to one physical tag in the translation lookaside buffer;
   at least one vector comparator comparing the second vector from the memory structure to the first vector from the translation lookaside buffer.

4. The cache of claim 3, the virtual address further comprising page offset bits, the cache further comprising:
   a second memory structure, receiving the index bits, the second memory structure containing stored page offset bits;
   at least one offset comparator receiving stored page offset bits from the second memory structure as designated by the index bits and receiving page offset bits from the virtual address; and
   at least one logic gate receiving an output of the offset comparator and an output of the vector comparator.

5. A method of accessing data in a cache, the method comprising the following steps:
   receiving, by the cache, a virtual address, the virtual address including a virtual tag and a virtual index;
   generating a first vector, by a translation lookaside buffer, the first vector having a plurality of bit positions, each bit position in the first vector having a one-to-one correspondence to a location in the translation lookaside buffer, each bit position in the first vector indicating whether the corresponding location in the translation lookaside buffer contains a match to the virtual tag;
   retrieving, by a first memory structure, from at least one location determined by the virtual index, at least one second vector, each bit position in each second vector having a one-to-one correspondence to a location in the translation lookaside buffer, each bit position in each second vector indicating whether the corresponding location in the translation lookaside buffer contains a particular physical tag; and
   comparing, by a digital comparator, the first vector and the second vector; and
   using the result of comparing to select data from a second memory structure.

6. The method of claim 5, the virtual address further comprising page offset bits, the method further comprising:
   comparing, by a third memory structure, the page offset bits of the virtual address to page offset bits stored in the third memory structure at a location determined by the virtual index; and using the result of comparing by the third memory structure to qualify the result of comparing by the digital comparator.

7. A cache, the cache receiving a virtual address comprising index bits and tag bits, the cache comprising:

a translation-lookaside buffer, the translation lookaside buffer receiving the tag bits and generating a first vector, the first vector having a plurality of bit positions, each bit position in the first vector having a one-to-one correspondence to a location in the translation lookaside buffer, each bit position in the first vector indicating whether the corresponding location in the translation lookaside buffer contains a match to the virtual tag;

a memory structure, receiving the index bits, the memory structure containing second vectors, at least one second vector designated by the index bits, each second vector having a plurality of bit positions, each bit position in each second vector having a one-to-one correspondence to a location in the translation lookaside buffer, each bit position in each second vector indicating whether the corresponding location in the translation lookaside buffer contains a match to a particular physical tag; and at least one vector comparator comparing the second vector from the memory structure to the first vector from the translation lookaside buffer.

8. The cache of claim 7, the virtual address further comprising page offset bits, the cache further comprising:

a second memory structure, receiving the index bits, the second memory structure containing stored page offset bits;

at least one offset comparator receiving stored page offset bits from the second memory structure as designated by the index bits and receiving page offset bits from the virtual address; and at least one logic gate receiving an output of the offset comparator and an output of the vector comparator.

* * * * *